US010815956B2

(12) United States Patent
Han

(10) Patent No.: US 10,815,956 B2
(45) Date of Patent: Oct. 27, 2020

(54) IGNITION PERFORMANCE INCREASING METHOD OF AUTOMOBILE AND AUTOMOBILE COMPRISING THE SAME

(71) Applicants: Hyundai Motor Company, Seoul (KR); KIA Motors Corporation, Seoul (KR)

(72) Inventor: Jung-Suk Han, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/208,832

(22) Filed: Dec. 4, 2018

(65) Prior Publication Data

US 2020/0032760 A1 Jan. 30, 2020

(30) Foreign Application Priority Data

Jul. 30, 2018 (KR) ........................ 10-2018-0088713

(51) Int. Cl.

| | |
|---|---|
| ***F02P 5/04*** | (2006.01) |
| ***F02D 41/00*** | (2006.01) |
| ***F02P 5/14*** | (2006.01) |
| ***F02P 5/16*** | (2006.01) |
| ***F02D 43/00*** | (2006.01) |

(52) U.S. Cl.

CPC ............ *F02P 5/045* (2013.01); *F02D 41/009* (2013.01); *F02D 43/00* (2013.01); *F02P 5/142* (2013.01); *F02P 5/16* (2013.01); *F02D 2200/02* (2013.01)

(58) Field of Classification Search

CPC .... F02P 5/045; F02P 5/06; F02P 5/142; F02D 41/009; F02D 41/0097; F02D 41/0095; F02D 41/263; F02D 41/062; F02D 43/00; F02D 2200/02; F02D 2041/0092; F01L 1/34

See application file for complete search history.

(56) References Cited

U.S. PATENT DOCUMENTS

| | | | | |
|---|---|---|---|---|
| 6,502,550 B1 * | 1/2003 | Kotwicki | F02D 37/02 | 123/406.47 |
| 2003/0109981 A1 * | 6/2003 | Bortolin | F02D 41/009 | 701/102 |
| 2005/0278109 A1 * | 12/2005 | Ando | F02D 41/009 | 701/112 |
| 2008/0027622 A1 * | 1/2008 | McDaniel | F02D 41/009 | 701/102 |
| 2009/0276145 A1 * | 11/2009 | Schafer | F01L 1/024 | 701/105 |

(Continued)

FOREIGN PATENT DOCUMENTS

| | | |
|---|---|---|
| JP | H11132089 A | 5/1999 |
| JP | 2000087830 A | 3/2000 |
| KR | 20030036634 A | 5/2003 |

(Continued)

*Primary Examiner* — George C Jin

(74) *Attorney, Agent, or Firm* — Brinks Gilson & Lione

(57) ABSTRACT

An ignition performance increasing method of an automobile may include inputting a crank position sensor signal to detect a rotational position of a crankshaft of an engine, generating an engine angle tick, acquiring an engine synchronization by determining a position of the crankshaft and a position of a cam, setting a sync task at a specified position, and performing fuel injection and ignition.

6 Claims, 4 Drawing Sheets

ENGINE RUNNING
INPUT CRANK SIGNAL — S1
S2 IS CKP SIGNAL IN SUITABLE STATE? NO → CPK DIAGNOSIS MODULE — S3
YES
GENERATE ENGINE ANGLE TICK — S4
S5 IS ENGINE SYNCHRONIZATION GENERATED? YES
NO
S6 HAS GAP POINT PASSED? YES
NO
S7 IS CAM PATTERN RECOGNIZED? YES
S8 ACQUIRE ENGINE SYNCHRONIZATION
S9 IS NEAREST SYNC TASK-CURRENT ANGLE EQUAL TO OR GREATER THAN 1TOOTH? NO → S10 SET AT FIRST SYNC TASK: NEAREST SYNC TACK POSITION
YES
SET FIRST SYNC TASK: (CURRENT ANGLE + 1TOOTH) POSITION — S11
OPERATE INJ, ASW, IGN, ASW — S12
OPERATE INJ DRV, IGN DRV — S13
INJECT FUEL AND IGNITE — S14

(56) References Cited

U.S. PATENT DOCUMENTS

2014/0299080 A1 10/2014 Zouboff et al.
2017/0175654 A1* 6/2017 Eom ..................... F02D 41/009

FOREIGN PATENT DOCUMENTS

KR 20050095642 A 9/2005
KR 100615728 B1 8/2006
KR 20140127561 A 11/2014
KR 20160065299 A 6/2016

* cited by examiner

IGNITION PERFORMANCE INCREASING METHOD OF AUTOMOBILE AND AUTOMOBILE COMPRISING THE SAME

CROSS-REFERENCE TO RELATED APPLICATIONS

This application claims priority to and the benefit of Korean Patent Application No. 10-2018-0088713, filed on Jul. 30, 2018, the entire contents of which are incorporated herein by reference in their entirety.

FIELD

The present disclosure relates to an ignition performance increasing method of an automobile and an automobile including the same, and more particularly, to quickly activating a sync task after engine synchronization to perform immediate injection and ignition.

BACKGROUND

The statements in this section merely provide background information related to the present disclosure and may not constitute prior art.

An automobile equipped with an internal combustion engine controls injection timing and ignition timing of fuel in accordance with running conditions of the automobile or the like. In particular, in the case of a multi-cylinder engine, it is desirable to precisely synchronize the injection timing of fuel and the ignition timing for each cylinder in order to suppress a generation of noxious gas due to a reduction in power or an incomplete combustion.

To synchronize the engine, a crankshaft position sensor and a cam sensor may be used to accurately detect rotational positions of crankshafts for each cylinder. That is, in order to perform the synchronization of the engine, first of all, it is desirable to accurately detect the rotational position of the crankshafts for each cylinder.

The crankshaft position sensor may detect a rugged tooth formed on a synchronous rotary body of the crankshaft, detect a rotation angle and the revolutions per minute (RPM) of the crankshaft, and output the rotation angle and the RPM of the crankshaft as a crank signal of a constant pulse shape. The cam sensor may recognize an angle identification protrusion formed on the synchronous rotary body of the camshaft for intake and exhaust to detect the position of the cam shaft and detect falling edge and rising edge timings, and output the detected position of the cam shaft and the detected falling edge and rising edge timings as a pulse-shaped cam signal. An electronic control unit (ECU) may figure out positions of pistons in each cylinder from the crank signal, and may figure out which stroke the pistons in each cylinder are in by using the cam signal. In this way, the electronic control unit may control the fuel injection timing and the ignition timing of each cylinder.

When the engine is ignited, an engine position management (EPM) driver starts synchronization. The synchronization refers to a conversion of an actual crank and cam shape of the engine into an angle. That is, it can be said that the synchronization is generated when it is determined where the engine is now by processing a signal input from a crankshaft position (CKP) sensor and a cam sensor. When the synchronization is generated, the EPM driver sets a sync task at specific positions (e.g., 0°, 180°, 360°, 540°). In the sync task, the injection and the ignition are calculated, and the calculated values are transferred to the fuel and ignition driver to generate the fuel injection and ignition in the engine. That is, the fuel injection and ignition may occur after the sync task is activated. In this context, the sync task always occurs only at a specified position regardless of the synchronization timing, and a first sync task is generated nearest to the timing when the synchronization is generated. For example, if the timing when the engine synchronization is generated is 10°, the nearest sync task position is 180°, so the first sync task is generated at 180°.

As described above, since the sync task is activated only at the specified position regardless of the synchronization timing of the engine, there is a period in which the injection and ignition are not calculated in an early cranking period. That is, for example, if the synchronization timing is 10°, the engine is not operated for 170° until it reaches 180° which is the nearest synchronization point, and is only cranked. If a cranking RPM of the starter motor is 300 RPM on average, a time corresponding to 170° is 90 ms and the engine is not operated for 90 ms after the engine synchronization.

SUMMARY

The present disclosure describes an ignition performance increasing method of an automobile and an automobile including the same capable of improve engine ignition performance by quickly activating a sync task after engine synchronization to perform immediate injection and ignition.

The following description describes various aspects of such a method. Also, it will be apparent to those skilled in the art that aspects of the present disclosure can be realized by the means as claimed and combinations thereof.

In one aspect, an ignition performance increasing method of an automobile may include inputting a crank position sensor signal to detect a rotational position of a crankshaft of an engine; generating an engine angle tick; acquiring an engine synchronization acquiring by determining a position of the crankshaft and a position of a cam; setting a sync task at a specified position; and performing fuel injection and ignition.

Before the generating of the engine angle tick, the crank position sensor signal may be diagnosed.

The engine angle tick may be a rotation angle of the crankshaft per tick.

Before the acquiring of the engine synchronization, it may be determined whether it passes a gap point.

It may be determined whether a cam pattern is recognized when it does not pass the gap point.

In the setting of the sync task, a nearest sync task may be compared with a current angle.

When the sync task is compared with a current angle to determine that the current angle is equal to or greater than 1Tooth, a first sync task may be set at a point where current angle +1Tooth.

When the sync task is compared with a current angle to determine that the current angle is within 1Tooth, a first sync task may be set at a nearest sync task position.

There is further provided a vehicle including the ignition performance increasing method of an automobile.

The ignition performance increasing method of an automobile and the automobile including the same may shorten the ignition time by quickly activating the sync task after the engine synchronization to perform immediate injection and ignition, thereby improving the engine ignition performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
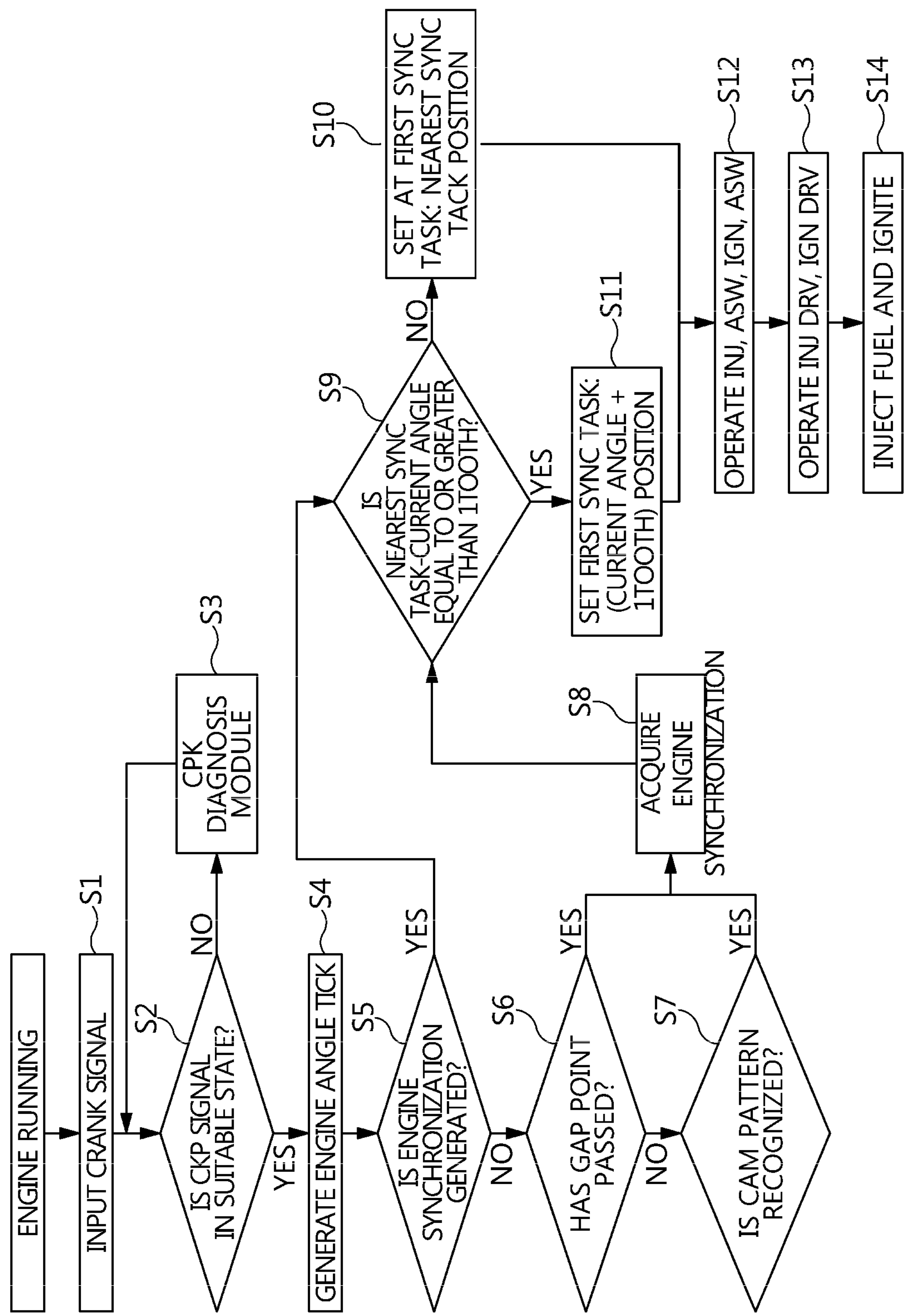
FIG. 1 is a flowchart of an ignition performance increasing method of an automobile.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The description allows those skilled in the art to understand the technical aspects. In addition, matters described in the accompanying drawings may be different from those actually implemented by the schematic drawings.

It is to be understood that when any component is referred to as being connected to or coupled to another component, it may be connected directly to or coupled directly to another component or be connected to or coupled to another component with the other component intervening therebetween.

The "connection" used herein refers to a direction connection or an indirect connection between one member and other members, and may refer to all physical connections such as adhesion, attachment, fastening, joining, and bonding.

Also, expressions such as 'first and second' are used only to distinguish a plurality of components, and do not limit an order or other features among components.

Singular forms are intended to include plural forms unless the context clearly indicates otherwise. It may be interpreted that terms "include", "have", or the like, specify the presence of features, numerals, steps, operations, components, parts mentioned in the present specification, or a combination thereof, but do not preclude the addition of one or more other features, numerals, steps, operations, components, parts, or a combination thereof.

Figure 2:
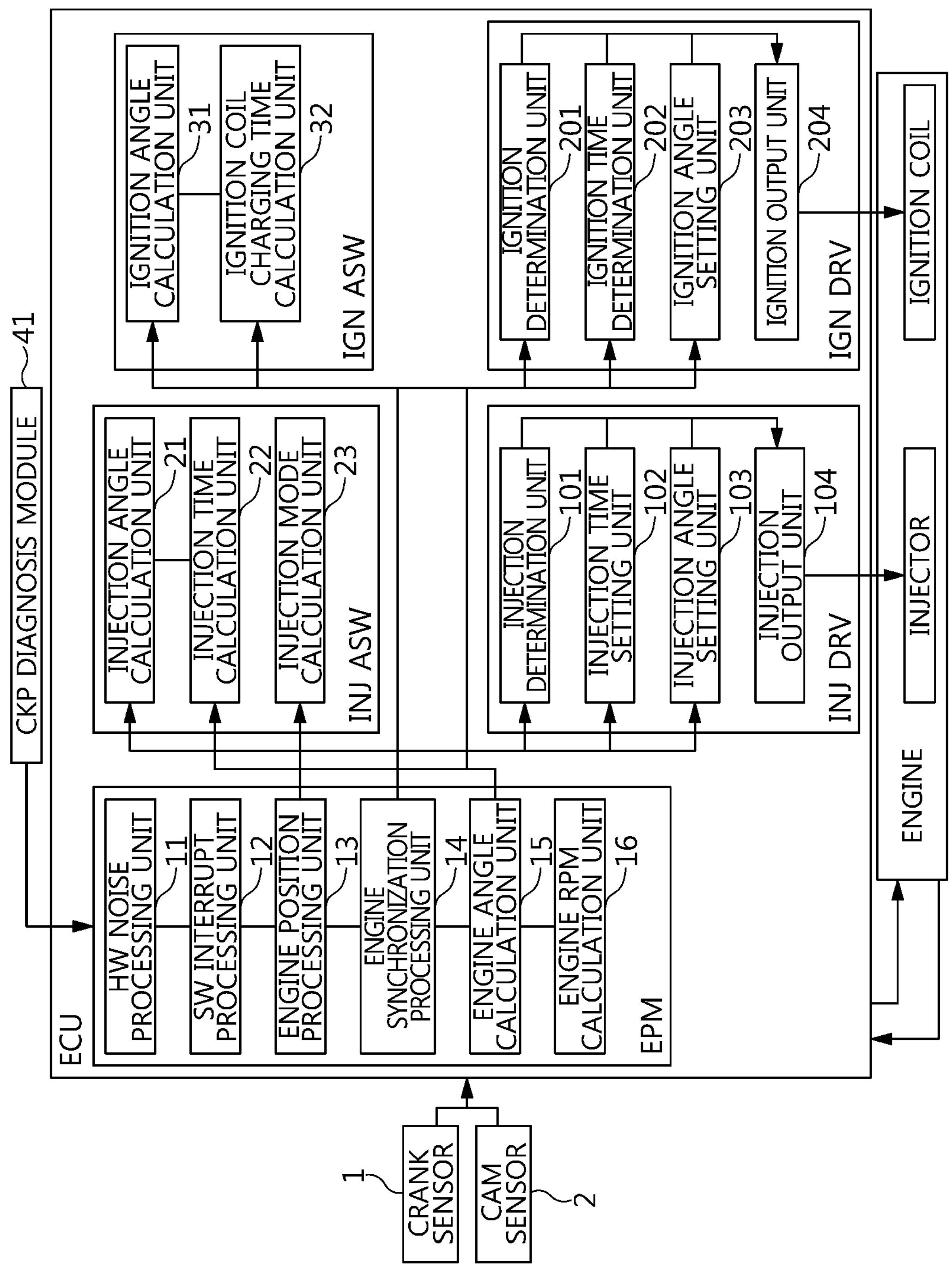
FIG. 2 is a schematic diagram of an ignition performance increasing system of an automobile.

FIG. 1 is a flowchart of an ignition performance increasing method of an automobile according to an aspect of the present disclosure, and FIG. 2 is a schematic diagram of an ignition performance increasing system of an automobile according to an aspect of the present disclosure.

Referring to FIGS. 1 and 2, the engine synchronization is generated in an EPM driver when an engine is ignited to set a sync task and perform fuel injection and ignition.

An ECU is configured to EPM, an inject application software (ASW), an ignition coil ASW, an inject driver, and an ignition coil driver, in which the EPM is configured to include a hardware noise processing unit 11, a software interrupt processing unit 12, an engine position processing unit 13, an engine position processing unit 13, an engine synchronization processing unit 14, an engine angle calculation unit 15, and an engine RPM calculation unit 16, and receives crank information from a crank sensor 1 and cam information from a cam sensor 2, and an EPM driver calculates an engine position, engine synchronization, an engine angle, an engine RPM or the like based on the received crank information and cam information. It is possible to accurately an engine position by using CKP and the cam information if the engine synchronization is generated in the EPM.

In one specific example, the ignition performance increasing method of an automobile includes inputting a crank position sensor signal (S1), generating an engine angle tick (S4), acquiring an engine synchronization (S8), setting a sync task (S9), and performing fuel injection and ignition (S14).

It is determined (S2) whether the crank position sensor signal is suitable before the inputting of the crank position sensor signal (S1) and the generating of the engine angle tick (S4) to diagnose the crank position sensor signal (S3). The engine angle tick may be the rotation angle of the crankshaft per tick.

The hardware noise processing unit 11 and the software interrupt processing unit 12 determine whether a noise component is present in the crank position sensor signal. If it is determined that no noise component is present, it is determined that the crank position sensor signal is in the suitable state, so the engine angle calculation unit 15 generates the engine angle tick (S4). The engine angle tick generates a virtual angle until a next crank position tooth is reached, regardless of the engine synchronization.

Next, it is determined whether the engine synchronization is acquired (S5) to set the sync task. It is determined (S6) whether it passes through a gap point before the acquiring of the engine synchronization (S8) to determine whether the cam pattern is recognized when it does not pass through the gap point (S7). Here, the cam pattern may be acquired as the cam signal generated by the cam sensor.

Here, the engine synchronization is generated when the EPM driver accurately determines the engine position based on the missing tooth or the cam pattern.

Subsequently, the setting of the sync task (S9) compares a current angle with the nearest sync task and compares the current angle with the sync task to set a first sync task at a point where current angle +1Tooth when the current angle is equal to or greater than 1Tooth (S11). The reason for giving a 1Tooth margin is because there is a module to be performed as soon as the synchronization is generated. This is because the synchronization task is to be completed before the synch task is set. The sync task is compared with the current angle to set the first sync task at the nearest sync task position when the current angle is within the 1Tooth (S10).

The above processes are performed in the EPM to operate the inject ASW, the ignition coil ASW, the inject driver, and the ignition coil driver.

Here, the inject ASW is configured to include an injection angle calculation unit 21, an injection time calculation unit 22, and an injection mode calculation unit 23, and the ignition coil ASW is configured to include an ignition angle calculation unit 31 and an ignition coil charging time calculation unit 32, such that it is calculated based on the signal input from the ECU.

After the setting of the sync task, the inject (ASW) and the ignition coil ASW are operated (S12), and after the inject ASW and the ignition coil ASW are operated, the inject driver and the ignition coil driver are operated (S13) to operate the injector and the ignition coil (S14).

The inject driver includes an injection determination unit 101, an injection time setting unit 102, an injection angle setting unit 103, and an injection output unit 104 and the ignition coil driver includes an ignition determination unit 201, an ignition time setting unit 202, an ignition angle setting unit 203, and an ignition output unit 204, such that it is calculated based on the signal input from the ECU.

It will be understood by those skilled in the art that the constituent elements not described herein may obscure the gist of the present disclosure, and the absence of a description does not mean that only the depicted components should be included.

Figure 3:
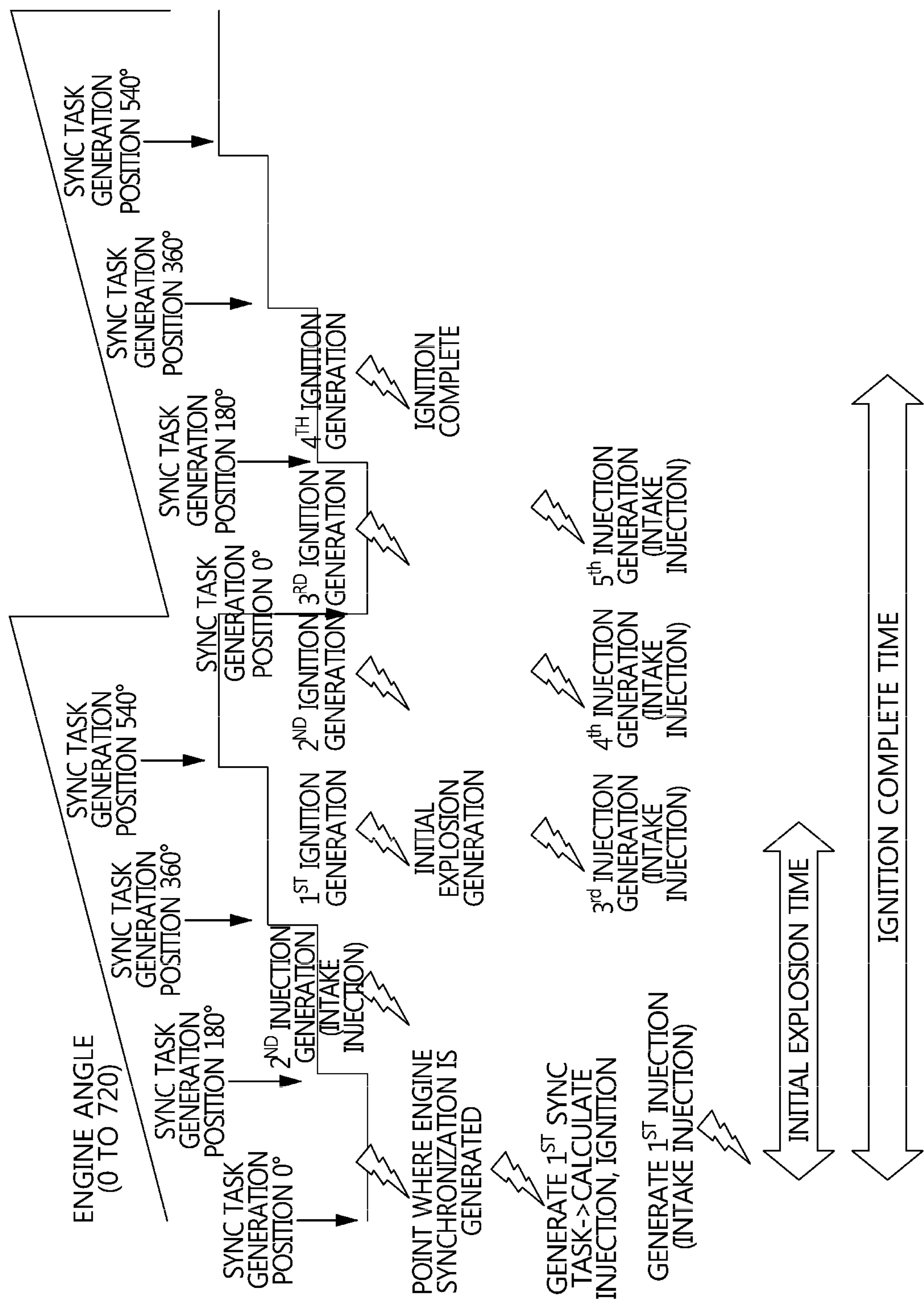
FIG. 3 is a flowchart of an ignition process of the ignition performance increasing method of an automobile.
Figure 4:
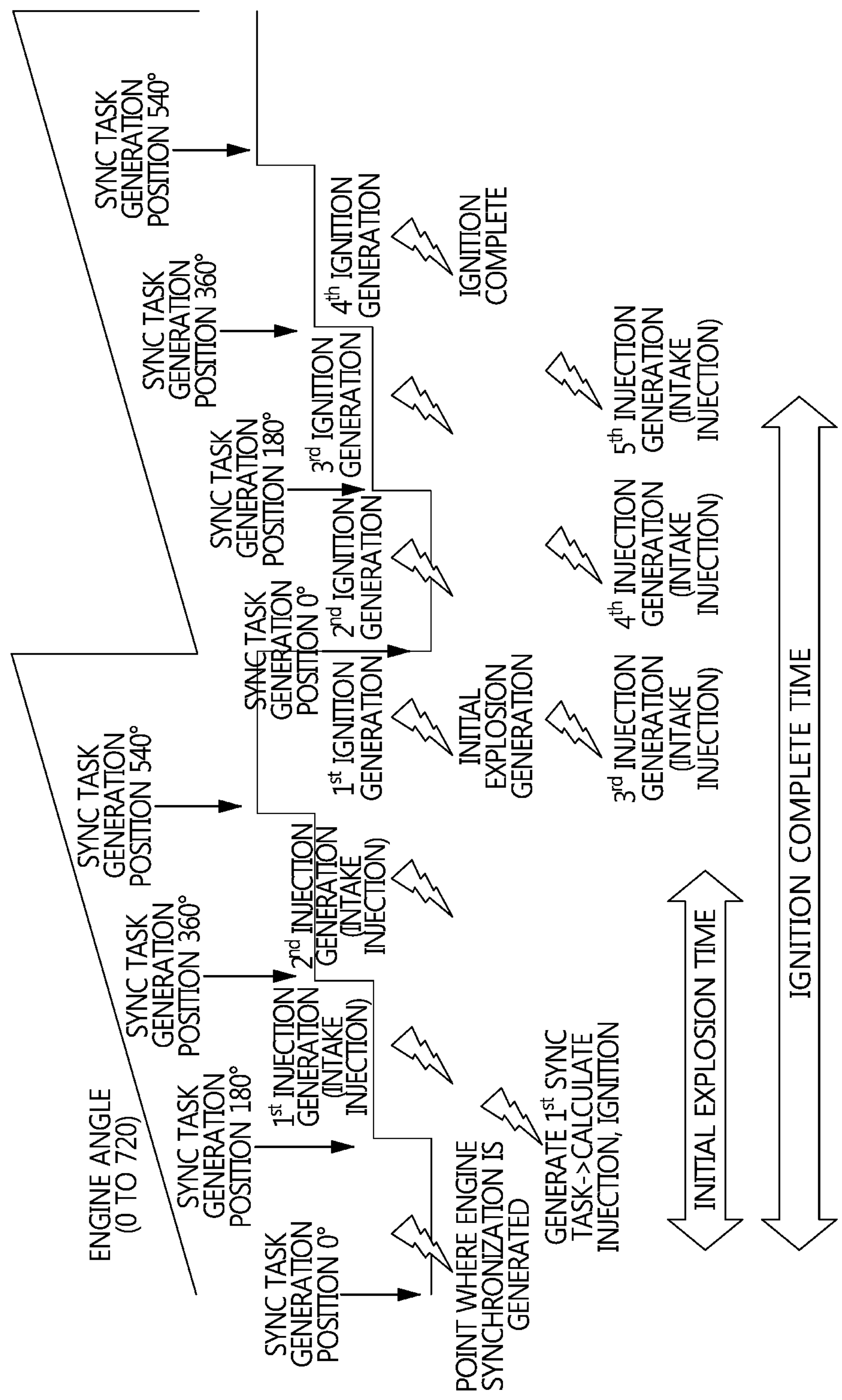
FIG. 4 is a schematic diagram showing a conventional ignition process.

FIG. 3 is a flowchart of an ignition process of the ignition performance increasing method of an automobile according to an aspect of the present disclosure and FIG. 4 is a schematic diagram showing a conventional ignition process.

FIG. 3 shows the actual ignition, the injection position, an initial explosion and a complete explosion when the sync task is activated immediately after the engine synchronization is generated in the ignition process in accordance with the ignition performance increasing method of an automobile according to one asepct of the present disclosure, in which the sync task is activated immediately after the engine synchronization is generated to immediately perform the first injection. By doing so, the first ignition cylinder precedes one cylinder with respect to the related art. That is, since the initial explosion precedes one cylinder, the ignition time is led by 180° based on four cylinders.

FIG. 4 shows the actual ignition and the injection position, and the time for the initial explosion, and the complete explosion after the engine synchronization is generated in the related art. Immediately after the first sync task is activated at the nearest sync position (180°) after the engine synchronization is generated, the first injection is performed. After the first injection, the initial explosion is generated while the first ignition is generated after 360°. Thereafter, the ignition is generated every 180° to perform the complete explosion.

Accordingly, the ignition performance increasing method of an automobile and the automobile including the same may shorten the ignition time by quickly activating the sync task after the engine synchronization to perform the immediate injection and ignition, thereby improving the engine ignition performance.

A person skilled in the art may understand that the principles of the present disclosure may be practiced in other detailed forms without changing the technical spirit or the features thereof. Therefore, it is to be noted that the description is merely illustrative in order to facilitate understanding of those skilled in the art among various possible examples, but the technical idea is not necessarily limited only by the proposed aspects, and various changes, additions and modifications may be made without departing from the spirit of the disclosure. In addition, the order of the structures described in the above-described process are not necessarily performed in a time series order, and as long as the gist is met even if the order of operations of the respective configurations and steps is changed, the process may be included in the scope of the present disclosure.

What is claimed is:

1. An ignition performance increasing method of an automobile, comprising:

inputting a crank position sensor signal to detect a rotational position of a crankshaft of an engine;

generating an engine angle tick which is a rotation angle of the crankshaft per tick;

acquiring an engine synchronization by determining a position of the crankshaft and a position of a cam;

setting a sync task at a specified position; and performing fuel injection and ignition, wherein the engine angle tick is generated as a virtual angle until a next crank position tooth is reached, regardless of the engine synchronization wherein in the setting of the sync task, a nearest sync task is compared with a current angle wherein when the sync task is compared with a current angle and the current angle is equal to or greater than the current angle plus one ("+1") tooth, a first sync task is set at a point corresponding to the current angle +1 tooth.

2. The ignition performance increasing method of claim 1, wherein before the generating of the engine angle tick, the crank position sensor signal is diagnosed.

3. The ignition performance increasing method of claim 1, wherein before the acquiring of the engine synchronization, it is determined whether it passes a gap point.

4. The ignition performance increasing method of claim 3, wherein it is determined whether a cam pattern is recognized when it does not pass the gap point.

5. A vehicle comprising the ignition performance increasing method of claim 1.

6. An ignition performance increasing method of an automobile, comprising:

inputting a crank position sensor signal to detect a rotational position of a crankshaft of an engine;

generating an engine angle tick which is a rotation angle of the crankshaft per tick;

acquiring an engine synchronization by determining a position of the crankshaft and a position of a cam:

setting a sync task at a specified position; and performing fuel injection and ignition, wherein the engine angle tick is generated as a virtual angle until a next crank position tooth is reached, regardless of the engine synchronization wherein in the setting of the sync task, a nearest sync task is compared with a current angle wherein when the sync task is compared with a current angle and the current angle is within one ("1") tooth, a first sync task is set at a nearest sync task position.

* * * * *